H. MOCK.
FIRELESS COOKER.
APPLICATION FILED JAN. 6, 1916.
1,273,645.
Patented July 23, 1918.
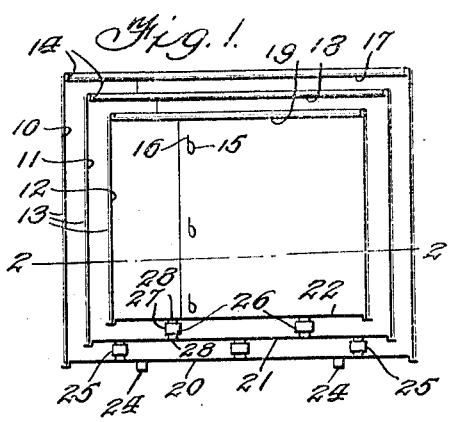
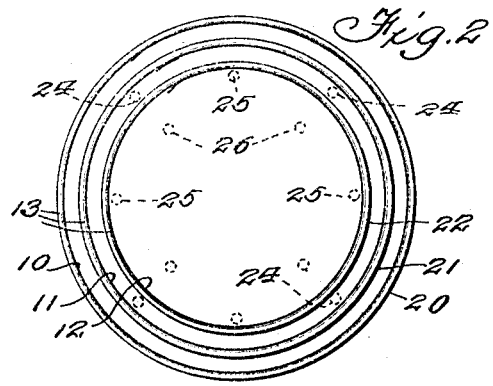
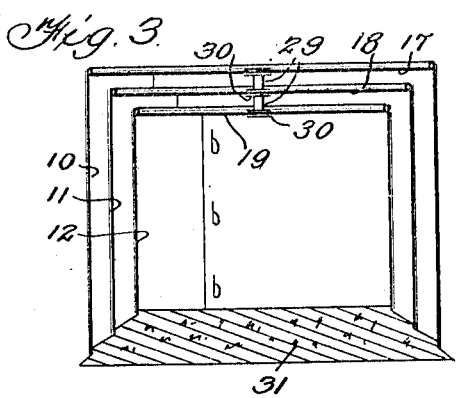
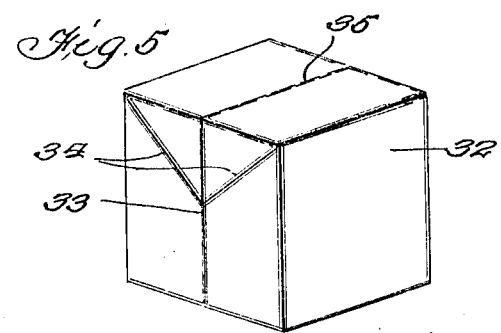
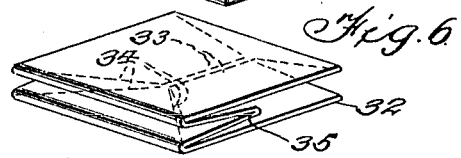
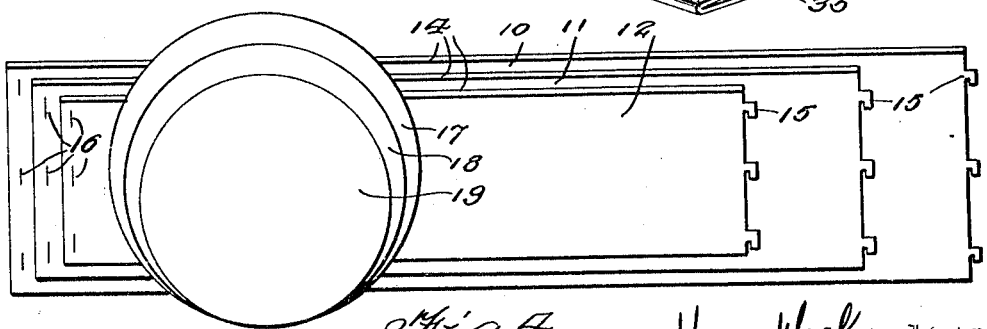
Hugo Mock Inventor

UNITED STATES PATENT OFFICE.

HUGO MOCK, OF NEW BRIGHTON, NEW YORK.

FIRELESS COOKER.

1,273,645. Specification of Letters Patent. Patented July 23, 1918.

Application filed January 6, 1916. Serial No. 70,604.

*To all whom it may concern:*

Be it known that I, HUGO MOCK, a citizen of the United States, residing at New Brighton, in the county of Richmond and State of New York, have invented certain new and useful Improvements in Fireless Cookers; and I do hereby declare the following to be a full, clear, and exact description of the invention, such as will enable others skilled in the art to which it appertains to make and use the same.

This invention is an improvement on the invention set forth in my Patent No. 1,160,939 dated November 16th, 1915, and is designed to produce a similar fireless cooker having the additional advantages of great lightness and economy in manufacture.

Substantially the invention comprises a series of concentric bell shaped members of varying sizes resting over each other on an insulated base or bases, the heat insulating quality of the cooker being dependent on the utilization of air spaces and the non-radiating qualities of metallic surfaces.

In the drawings,

Figure 1 presents a vertical sectional view through the cooker showing the parts assembled.

Fig. 2 shows a horizontal sectional view as on the line 2—2 of Fig. 1.

Fig. 3 shows a vertical sectional view with a different form of base and with the covers joined together.

Fig. 4 shows the covers disassembled as for shipping purposes.

Fig. 5 shows a perspective view of a modified form of a collapsible type and

Fig. 6 shows a perspective view of the type shown in Fig. 5 collapsed.

Instead of making these bell shaped covers entirely of metal as set forth in my Patent No. 1,160,939, for purposes of convenience and economy, same can be produced of paper or cardboard having one or both surfaces lined with tinfoil. The purpose of this tinfoil coating is to prevent radiation of heat while not interfering with the heat insulating quality of the air zones separating the various size covers.

Referring to the drawings, 10, 11 and 12 indicate bells concentrically arranged upon a base and each of these bells has a coating of tinfoil 13 added thereto. Each bell is made of a sheet of cardboard or the like having its upper edge turned over as at 14 to form an enlarged upper edge to retain the heads. One end of each of the side walls is provided with a series of lugs 15 and the opposite end of each of said side walls is provided with a series of slots 16 to receive the lugs 15 and thereby form a cylindrical wall. The side walls 10, 11 and 12 are each provided with circular heads 17, 18 and 19 respectively which will also be of cardboard or similar material covered with tinfoil.

The base comprises the disks 20, 21 and 22 which may have the edges thereof depressed to form shoulders to receive the lower ends of the side walls 10, 11 and 12. The disk 20 may be provided with legs 24 and between the disks 20, 21 and 22 are spacing members 25, and 26 respectively and each of these spacing members comprises an insulating plug 27 which may be detachably carried in sockets 28 formed on the disks 20, 21 or 22 as the case may be.

In Fig. 3 the heads 17, 18 and 19 are held together by fastening members 29 and 30 and in this figure there is shown a solid base 31, of non-conducting material such as wood, cork composition, felt or other material.

Figs. 5 and 6 show a rectangular bell structure 32 having the end walls creased as at 33 and 34 to permit said end walls being folded and the head of said bell is creased as at 35 to permit said head being folded as shown in Fig. 6.

A cooker made in accordance with the description here shown has the advantage of great heat non-conducting qualities without the use of any heat non-conducting medium other than air and paper and at the same time is light and convenient to ship.

Having thus described my invention, what I claim is:—

1. A fireless cooker comprising a series of downwardly opening paper hoods of varying sizes superimposed upon each other, said hoods being joined to each other at their tops by a common connecting member and a non-heat conducting base adapted to act as a support for said hoods and the food containing vessel.

2. A fireless cooker comprising a series of downwardly opening hoods of varying sizes superimposed upon each other, said hoods being joined to each other by a connecting member at their tops and a dense non-heat
5 conducting base adapted to act as a support for said hoods and for the food containing vessel.

In testimony whereof I affix my signature in presence of two witnesses.

HUGO MOCK.

Witnesses:
ROSALINE REID,
ALBERT M. DREIFUS.

Copies of this patent may be obtained for five cents each, by addressing the "Commissioner of Patents, Washington, D. C."